Patented Apr. 10, 1923.

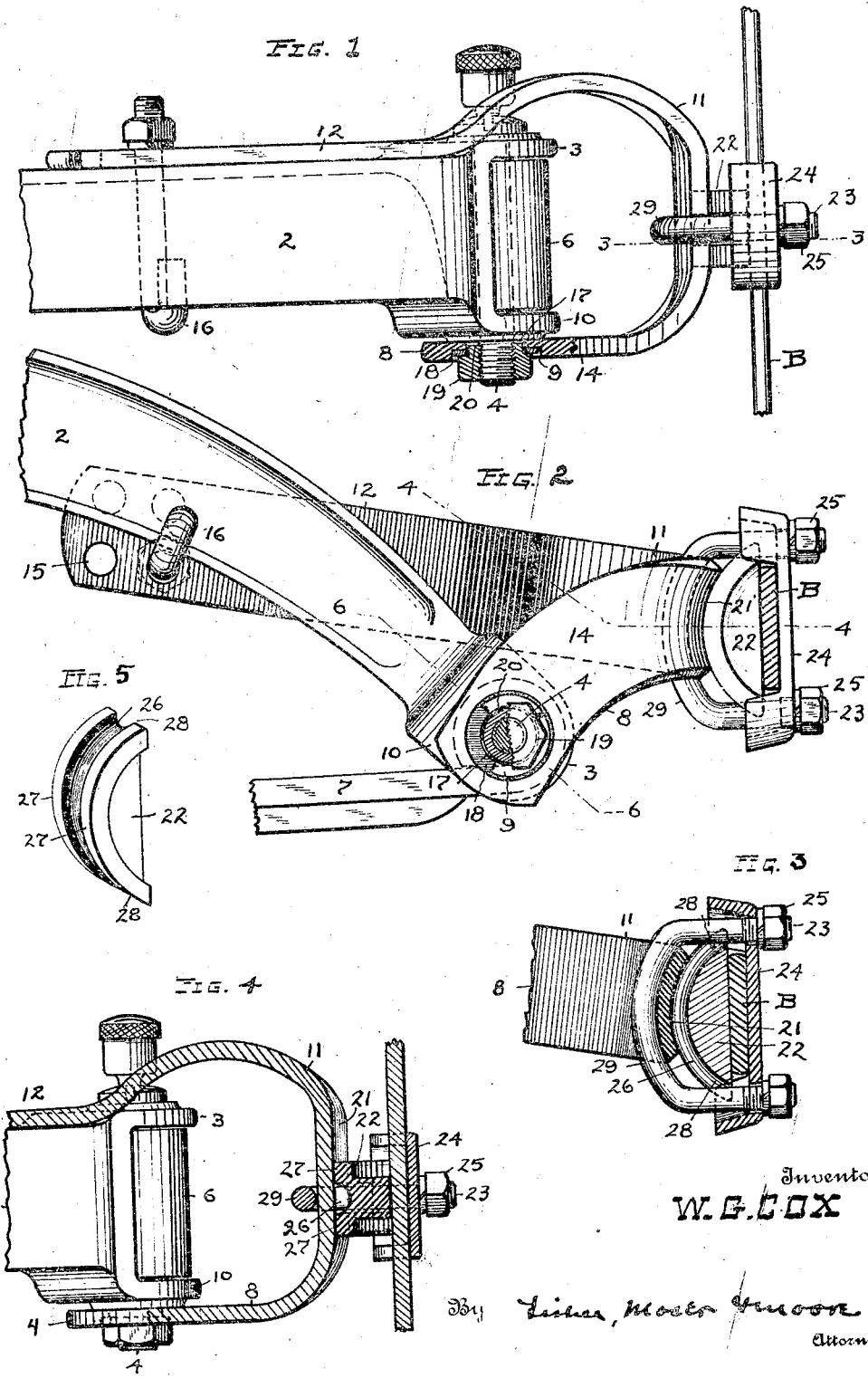

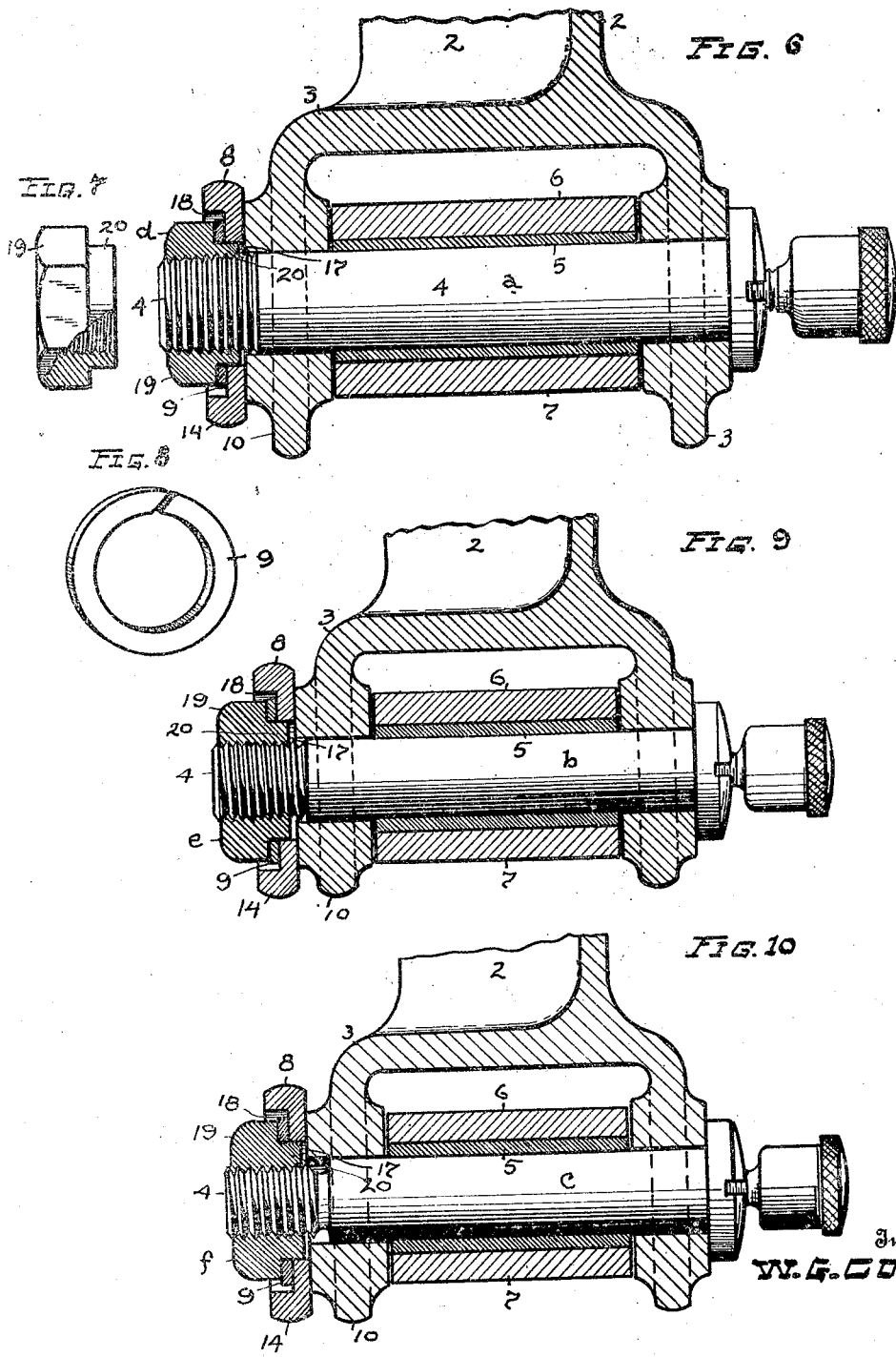

UNITED STATES PATENT OFFICE.

1,451,535

WILLIAM G. COX, OF CLEVELAND, OHIO, ASSIGNOR TO COX BRASS MANUFACTURING COMPANY, OF ALBANY, NEW YORK, A CORPORATION OF NEW YORK.

APPLIANCE FOR ATTACHING BUMPERS ADJUSTABLY TO AUTOMOBILES.

Application filed November 13, 1922. Serial No. 600,527.

*To all whom it may concern:*

Be it known that I, WILLIAM G. COX, a citizen of the United States, residing at Cleveland, in the county of Cuyahoga and State of Ohio, have invented certain new and useful Improvements in an Appliance for Attaching Bumpers Adjustably to Automobiles, of which the following is a specification.

This invention relates to appliances for attaching a bumper adjustably to an automobile chassis frame, the main object being to provide appliances of simple character and construction which will permit facile attachments to be made to chassis frame extremities of different shape and form and to spring bolts of different diameter, and which also permit the bumper to be held and clamped adjustably so that its impact face may be set and presented squarely at the end of the vehicle.

In the accompanying drawings, Fig. 1 is a top view of the curved end of one side member of an automobile chassis frame with one of my improved bumper attachment appliances affixed thereto and showing a short piece of a spring bar bumper clamped in place thereon. Fig. 2 is a side view of the parts shown in Fig. 1, the bumper bar being in section, and the shackle bolt and nut being partly broken away. Fig. 3 is a vertical section on line 3—3 of Fig. 1, and Fig. 4 is a horizontal section on line 4—4 of Fig. 2. Fig. 5 is a perspective view of the clamping segment. Fig. 6 is an enlarged sectional view on line 6—6 of Fig. 2, and Fig. 7 is a side view, partly in section, of one of the shackle nuts. Fig. 8 is a perspective of a lock washer used with the nut. Figs. 9 and 10 are sectional views corresponding to Fig. 6 showing different sizes of shackle bolts but the same sized bracket member secured in place thereon. The side members 2 of the chassis frame of an automobile are commonly bent downwardly at one or both ends and provided with forked or recessed extremities 3 through which a shackle bolt 4 extends transversely. The common practice is to pass this bolt through a bushing 5 in the end eye 6 of the main leaf of a laminated suspension spring 7, especially the suspension spring at the front of a vehicle. But the side members 2 and the springs 7 vary in width, dependent upon the make or the size of the car, and the diameter of the bolt 4 varies accordingly. In general, the length of the bolt is such that it does not extend very far beyond the exposed face of an ordinary nut which is screwed upon the bolt against a lock washer 9 when no other piece or part of a standard car is in place between the lock washer and the side flange 10 of the frame extremity 3. It follows therefore that a bolt 4 as found in the standard car, would in many instances be too short to permit a separate piece of substantial thickness such as a bracket member 8, to be bolted against the frame extremity and have all of the screw-threads in the nut engage the screw threads on the bolt. I have however devised an arrangement whereby the present bolt may be used to make an absolutely secure connection and at the same time, permit the bracket member to be attached to bolts of different diameters. Thus, I provide a bracket 8 made of a flat steel bar which is bent into the form of an open loop 11 having parallel attachment arms 12 and 14, respectively, of different length. The longer arm 12 is straight and provided with four bolt openings 15 near its extremity to permit a hook bolt 16 or an equivalent clamping device to be inserted through any one of these openings in attaching this arm against the outer side of the side member 2. The shorter arm 14 is bent downwardly and has a single relatively large round bolt opening 17 therein which opens into a concentric round recess 18 in the outer flat side of the arm, and the bolt opening is relatively much larger in diameter than the largest shackle bolts 4 in common use so that the bolt is separated from the bracket by an annular space when the bolt extends through this opening. However, all loose play is eliminated by employing a special hexagonal nut 19 having a round reduced portion or extension 20 which is of substantially the same diameter as opening 17 so as to fit therein and provide a bearing for the bracket arm 14 when this nut is screwed upon the bolt. The split lock washer 9 is sleeved over the round extension 20 of the nut and is seated at the base of the round cavity or recess 18 when the nut is screwed home or to the uttermost, and in so doing, the nut also enters partly into said recess. In this way the bracket arm 14 is clamped tightly against the forked side 10 of frame member 2 and the full complement of screw-threads may be used in making a screw-connection without changing or removing the standard bolt forming a part of the regular equipment of the vehicle. This is of advantage because it avoids disassembling the hook-up for the spring, and also replacement of special bolts, many of these bolts being specially made for receiving oil or to convey oil from cups or oil attachments. A still further advantage resides in the facile way whereby one standard size of bracket member may be fitted to any car, large or small, having large or small shackle bolts. Thus, in Figs. 6 to 10, inclusive, I show three shackle bolts, *a*, *b* and *c*, having screw-threaded ends of different diameters but the respective bracket arms 14 are alike, having the same sized bolt openings 17 and recesses 18. The nuts *d*, *e* and *f*, differ from each other only in that their central screw-threaded openings conform to the screw-threaded end portions of the bolts of which they form complementary parts. The round extensions 20 of these nuts are all of the same diameter so as to use the same size lock washers and to permit these extensions to enter and have a bearing fit within the round opening 17 in any bracket arm 14 constructed according to my invention.

Bracket member 8 is adjustable angularly in respect to the chassis frame 2 by reason of the four bolt holes 15 and attachment bolt 16, but this adjustment is limited and may not always permit the bumper B to be placed squarely with its flat vertical impact face in a perpendicular plane, especially if the bumper has a broad impact face or is of the loop type or of the multiple bar kind. I therefore, produce a vertical curvature 21 in a segmental portion of the circular loop 11 of bracket 8; that is to say, the flat bar forming this bracket is pressed into a concavo-convex form at the front of loop 11 to permit a circular segment 22 to be seated rotatably at the front side of the bracket and to be clamped adjustably in place thereon together with a bumper bar B by means of a U-bolt 23, a clip 24, and nuts 25. Segment 22 has a central groove 26 in its circular clamping side which provides two spaced seating faces 27—27 and also notched ends 28—28, the latter serving as guides for the straight legs of U-bolt 23 and to hold the said segment from lateral displacement when fitted between the legs of the U-bolt. To promote adjustment and clamping the yoke portion 29 of the U-bolt may also be curved to conform to the vertical curvature of the front seating portion of the bracket. It should also be understood that in attaching a bumper to a chassis frame, complementary sets of the attachment devices are used at opposite sides of the chassis frame, and the bumper may be a spring bar bumper or any other type of bumper or buffer capable of being clamped in place substantially as herein shown and described.

What I claim is:

1. A loop-shaped bracket having rearwardly extending attachment arms and a concavo-convex front portion, a rounded clamping segment seated within the concaved side of said front portion, and a yoke-shaped clamping device and associated clamping means adapted to secure a bumper and said segment jointly together in rotatable adjustable position upon said bracket.

2. A loop shaped bracket having a long rearwardly-extending attachment arm and a short downwardly-extending attachment arm and the loop having a horizontally-extending concaved portion at the front thereof, in combination with a rounded clamping segment seated within said concaved portion of the loop, a U-bolt encircling said concaved portion of the loop opposite said segment, a bumper clamping member adjustably engaged with said U-bolt at the front of said segment, and nuts on said bolt engaging said clamping member.

3. A loop-shaped bracket made of flat strap-metal having a long arm provided with bolt openings and a short arm provided with a round recess in its outer side and a round bolt opening centrally at the base of said recess, the front portion of the loop being concavo-convex vertically to receive a rounded bumper clamping element and to provide a rounded rear-clamping surface for a yoke-shaped clamping member.

In testimony whereof I affix my signature hereto.

WILLIAM G. COX.